(12) United States Patent
Mighani et al.

(10) Patent No.: US 9,781,477 B2
(45) Date of Patent: Oct. 3, 2017

(54) SYSTEM AND METHOD FOR LOW-LATENCY MULTIMEDIA STREAMING

(75) Inventors: Farhad Mighani, San Jose, CA (US); Alberto Duenas, Mountain View, CA (US); Nguyen Nguyen, San Jose, CA (US); Gorka Garcia, Madrid (ES)

(73) Assignee: Cavium, Inc., Mountain View, CA (US)

( * ) Notice: Subject to any disclaimer, the term of this patent is extended or adjusted under 35 U.S.C. 154(b) by 1149 days.

(21) Appl. No.: 12/774,608

(22) Filed: May 5, 2010

(65) Prior Publication Data

US 2011/0276710 A1 Nov. 10, 2011

(51) Int. Cl.
*H04L 29/06* (2006.01)
*H04N 21/442* (2011.01)
*H04N 21/432* (2011.01)
*H04N 21/4402* (2011.01)

(52) U.S. Cl.
CPC ... *H04N 21/44227* (2013.01); *H04L 65/4084* (2013.01); *H04L 65/605* (2013.01); *H04L 65/607* (2013.01); *H04L 65/80* (2013.01); *H04N 21/4325* (2013.01); *H04N 21/4402* (2013.01)

(58) Field of Classification Search
None
See application file for complete search history.

(56) References Cited

U.S. PATENT DOCUMENTS

| | | | |
|---|---|---|---|
| 5,703,646 A * | 12/1997 | Oda | 375/240.13 |
| 2004/0071106 A1 | 4/2004 | Ito et al. | |
| 2006/0179459 A1 | 8/2006 | Chiba | |
| 2007/0223586 A1 | 9/2007 | Nagai et al. | |
| 2008/0040453 A1 | 2/2008 | Cohen | |
| 2008/0055399 A1 | 3/2008 | Woodworth et al. | |
| 2008/0104652 A1 | 5/2008 | Swenson et al. | |

* cited by examiner

*Primary Examiner* — Mikhail Itskovich

(57) ABSTRACT

Systems and methods for transmitting a multimedia stream over a communication link on a network are disclosed. The systems and methods adaptively adjust encoding parameters based on monitoring changing conditions of the network. A transmitter includes an adaptive-rate encoder that adaptively adjusts a video encoding bit rate in response to changing conditions of the communication link. The encoder maintains tight rate control by utilizing slice processing and sub-frame rate adaptation, as well as maintaining a headroom between the channel bit rate and the video encoding bit rate. The adaptive-rate encoder also embeds intra-frame constraints in predictive frames traffic in order to reduce latency.

20 Claims, 11 Drawing Sheets

SYSTEM 10

| 501 | 502 | 503 | 504 | 505 | 506 | 507 | 508 | 509 |
|---|---|---|---|---|---|---|---|---|
| 16 | 32 | 48 | 64 | 80 | 96 | 112 | 128 | 144 |
| 15 | 31 | 47 | 63 | 79 | 95 | 111 | 127 | 143 |
| 14 | 30 | 46 | 62 | 78 | 94 | 110 | 126 | 142 |
| 13 | 29 | 45 | 61 | 77 | 93 | 109 | 125 | 141 |
| 12 | 28 | 44 | 60 | 76 | 92 | 108 | 124 | 140 |
| 11 | 27 | 43 | 59 | 75 | 91 | 107 | 123 | 139 |
| 10 | 26 | 42 | 58 | 74 | 90 | 106 | 122 | 138 |
| 9 | 25 | 41 | 57 | 73 | 89 | 105 | 121 | 137 |
| 8 | 24 | 40 | 56 | 72 | 88 | 104 | 120 | 136 |
| 7 | 23 | 39 | 55 | 71 | 87 | 103 | 119 | 135 |
| 6 | 22 | 38 | 54 | 70 | 86 | 102 | 118 | 134 |
| 5 | 21 | 37 | 53 | 69 | 85 | 101 | 117 | 133 |
| 4 | 20 | 36 | 52 | 68 | 84 | 100 | 116 | 132 |
| 3 | 19 | 35 | 51 | 67 | 83 | 99 | 115 | 131 |
| 2 | 18 | 34 | 50 | 66 | 82 | 98 | 114 | 130 |
| 1 | 17 | 33 | 49 | 65 | 81 | 97 | 113 | 129 |

Frame 50

FIG. 5

SYSTEM AND METHOD FOR LOW-LATENCY MULTIMEDIA STREAMING

COPYRIGHT NOTICE

A portion of the disclosure of this patent document contains material that may be subject to copyright protection. The copyright owner has no objection to the facsimile reproduction by anyone of the patent document or the patent disclosure as it appears in the Patent and Trademark Office patent file or records, but otherwise reserves all copyright rights.

TECHNICAL FIELD

The present application relates to systems and methods for delivering a multimedia stream over a network.

BACKGROUND

Multimedia streams including audio and video are available from a wide variety of sources, including broadcast television, cable and satellite, digital versatile disc (DVD) players, Blu-ray players, gaming consoles, personal computers, set-top boxes, and the like. Additionally, improvements in audio and video coding techniques coupled with high-speed network connections have made possible new applications such as streaming video, video "place-shifting", and video on demand (VOD). As the number of sources of video content has increased, so has the number of displays on which to view that content. Advances in display technologies have led to the proliferation of inexpensive consumer devices with video playback capabilities including MP3 players, personal digital assistants (PDAs) and handheld computers, smartphones, and the like. Smaller, lighter displays also afford greater portability for computer monitors and televisions.

Direct-wired connections exist between many conventional sources and displays such as computer-to-monitor or DVD player-to-television. Networked connections exist in limited applications such as video place-shifting wherein, for example, video content from a set-top box is accessible by a personal computer or other device over a network connection. Wireless connectivity between a wide variety of source and display combinations is attractive due to the sheer number of potential source/display pairs and the desire for mobility.

Various wireless solutions exist for transmitting audio streams. Wireless speaker and headphone solutions may utilize, for example, radio frequency (RF) and Bluetooth. Wireless solutions also exist for computer keyboards and mice, either utilizing infra-red (IR) or Bluetooth to transmit control information. Audio data, video data, and control information all have differing requirements with respect to bandwidth, tolerable delay, and error resiliency. What is needed is a wireless solution for transmitting audio streams, video streams, as well as control information such as keyboard and mice commands as well as playback commands from a remote control.

Due to the popularity of WiFi networks, in particular IEEE 802.11 networks, WiFi is one possibility for a wireless solution for transmitting multimedia streams. The wireless solution should possess all the characteristics of wired connectivity with the advantage of mobility. The ideal required characteristics of such a solution are low delay, error resiliency, and no perceptible degradation in audio and video quality, and support for end-to-end communication protocols. For example, a wireless solution could extend high definition multimedia interface (HDMI) connectivity up to 300 feet.

More generally, there is a need for a solution for connecting a wide variety of sources with a wide variety of displays over a network. The ideal solution would optimally utilize the particular characteristics of a specific network, monitor the conditions of the network, and adaptively adjust the encoding parameters of the multimedia stream. In order to provide high-quality video and high performance in a variety of applications, it would have very low latency.

SUMMARY

In one embodiment of the present invention, a method of transmitting a multimedia stream over a network is disclosed. The method comprises receiving a multimedia stream from a source, the multimedia stream comprising video data, determining a first set of video encoding parameters, encoding a first portion of the video data into a first encoded video slice using the first set of video encoding parameters, transmitting the first encoded video slice over a communication link of the network to a receiver, monitoring conditions of the communication link determining a second set of video encoding parameters based on the conditions of the communication link, encoding a second portion of the video data into a second encoded video slice using the second set of video encoding parameters, and transmitting the second encoded video slice over the communication link to the receiver, wherein the first encoded video slice and the second encoded video slice comprise P-frame macroblocks. Determining a first set of video encoding parameters may comprise, for example, determining a current channel bit rate (cur_CBR) of the communication link, determining a current headroom factor cur_$\alpha$, and setting a current video bit rate (cur_VBR) for encoding the multimedia stream such that the cur_CBR−cur_VBR$\geq$cur_$\alpha$. Determining a second set of video encoding parameters based on the conditions of the communication link may comprise, for example, monitoring the communication link to determine a new channel bit rate (new_CBR), determining a channel bit rate reduction $\beta$, wherein $\beta$=cur_CBR−new_CBR, and adjusting cur_VBR if $\beta$>cur_$\alpha$. Alternatively, determining a second set of video encoding parameters based on the conditions of the communication link may comprise monitoring the communication link to determine a new channel bit rate (new_CBR), determining a channel bit rate reduction $\beta$, wherein $\beta$=cur_CBR−new_CBR, and adjusting cur_$\alpha$ if $\beta$>cur_$\alpha$. Additionally, determining a second set of video encoding parameters based on the conditions of the communication link may comprise, for example, monitoring the communication link to determine a new channel bit rate (new_CBR), determining a channel bit rate reduction $\beta$, wherein $\beta$=cur_CBR−new_CBR, determining a local maximum drop in channel bit rate loc_max_$\beta$, wherein loc_max_$\beta$ is the largest $\beta$ observed over a time period t, and adjusting one or more of cur_VBR and cur_$\alpha$ if loc_max_$\beta$$\leq$a predetermined threshold $\beta$_min or if t$\geq$a predetermined threshold t_max. Alternatively, determining a second set of video encoding parameters based on the conditions of the communication link may comprise, for example, monitoring the communication link to determine a new channel bit rate (new_CBR), determining a channel bit rate reduction $\beta$, wherein $\beta$=cur_CBR−new_CBR, determining an average drop in channel bit rate avg_$\beta$, wherein avg_$\beta$ is the average $\beta$ observed over a time period t, and adjusting one or more of cur_VBR and cur_α if avg_β≤a predetermined threshold β_min or if t≥a predetermined threshold t_max.

In another embodiment of the present invention, a method of encoding a multimedia stream for transmission over a network is disclosed. The method comprises determining a current channel bit rate (cur_CBR) of a communication link on the network, determining a current headroom factor cur_α, setting a current video bit rate (cur_VBR) for encoding the multimedia stream such that the cur_CBR−cur_VBR≥cur_α, monitoring the communication link to determine a new channel bit rate (new_CBR), determining a channel bit rate reduction β, wherein β=cur_CBR−new_CBR, and adjusting cur_VBR if β>cur_α. The method may further comprise adjusting cur_α if β>cur_α. The method may further comprise determining a local maximum drop in channel bit rate loc_max_β, wherein loc_max_β is the largest β observed over a time period t, and adjusting one or more of cur_VBR and cur_α if loc_max_β≤a predetermined threshold β_min or if t≥a predetermined threshold t_max. Alternatively, the method may further comprise determining an average drop in channel bit rate avg_β, wherein avg_β is the average β observed over a time period t, and adjusting one or more of cur_VBR and cur_α if avg_β≤a predetermined threshold β_min or if t≥a predetermined threshold t_max.

In another embodiment of the present invention, a system for transmitting a multimedia stream over a network is disclosed. The system comprises a transmitter adapted to perform the following: receive a multimedia stream from a source, the multimedia stream comprising video data, determine a first set of video encoding parameters, encode a first portion of the video data into a first encoded video slice using the first set of video encoding parameters, transmit the first encoded video slice over a communication link of the network to a receiver, monitor conditions of the communication link, determine a second set of video encoding parameters based on the conditions of the communication link, encode a second portion of the video data into a second encoded video slice using the second set of video encoding parameters, and transmit the second encoded video slice over the communication link to the receiver, wherein the first encoded video slice and the second encoded video slice comprise P-frame macroblocks. The transmitter may be further adapted, for example, to perform the following: determine a current channel bit rate (cur_CBR) of the communication link, determine a current headroom factor cur_α, and set a current video bit rate (cur_VBR) for encoding the multimedia stream such that the cur_CBR−cur_VBR≥cur_α. The transmitter may also be further adapted to perform the following: monitor the communication link to determine a new channel bit rate (new_CBR), determine a channel bit rate reduction β, wherein β=cur_CBR−new_CBR, and adjust cur_VBR if β>cur_α. The transmitter may be further adapted, for example, to perform the following: monitor the communication link to determine a new channel bit rate (new_CBR), determine a channel bit rate reduction β, wherein β=cur_CBR−new_CBR, and adjust cur_α if β>cur_α. The transmitter may be further adapted, for example, to perform the following: monitor the communication link to determine a new channel bit rate (new_CBR), determine a channel bit rate reduction β, wherein β=cur_CBR−new_CBR, determine a local maximum drop in channel bit rate loc_max_β, wherein loc_max_β is the largest β observed over a time period t, and adjust one or more of cur_VBR and cur_α if loc_max_β≤a predetermined threshold β_min or if t≥a predetermined threshold t_max. The transmitter may be further adapted, for example, to perform the following: monitor the communication link to determine a new channel bit rate (new_CBR), determine a channel bit rate reduction β, wherein β=cur_CBR−new_CBR, determine an average drop in channel bit rate avg_β, wherein avg_β is the average β observed over a time period t, and adjust one or more of cur_VBR and cur_α if avg_β≤a predetermined threshold β_min or if t≥a predetermined threshold t_max.

In another embodiment of the present invention, a system for encoding a multimedia stream for transmission over a network is disclosed. The system comprises an encoder adapted to perform the following: determine a current channel bit rate (cur_CBR) of a communication link on the network, determine a current headroom factor cur_α, set a current video bit rate (cur_VBR) for encoding the multimedia stream such that the cur_CBR−cur_VBR≥cur_α, monitor the communication link to determine a new channel bit rate (new_CBR), determine a channel bit rate reduction β, wherein β=cur_CBR−new_CBR, and adjust cur_VBR if β>cur_α. The encoder may be further adapted, for example, to perform the following: adjust cur_α if β>cur_α. The encoder may be further adapted, for example, to perform the following: determine a local maximum drop in channel bit rate loc_max_β, wherein loc_max_β is the largest β observed over a time period t, and adjust one or more of cur_VBR and cur_α if loc_max_β a predetermined threshold β_min or if t≥a predetermined threshold t_max. The encoder may be further adapted, for example, to perform the following: determine an average drop in channel bit rate avg_β, wherein avg_β is the average β observed over a time period t, and adjust one or more of cur_VBR and cur_α if avg_β≤a predetermined threshold β_min or if t≥a predetermined threshold t_max.

BRIEF DESCRIPTION OF DRAWINGS

The foregoing summary, as well as the following detailed description, will be better understood when read in conjunction with the appended drawings. For the purpose of illustrating the invention, there are shown in the drawings examples that are presently preferred. It should be understood, however, that the invention is not limited to the precise arrangements and instrumentalities shown. In the drawings:

FIG. 5 shows an example of a video frame divided into slices;

DETAILED DESCRIPTION

Reference will now be made in detail to the present examples of the invention illustrated in the accompanying drawings. Wherever possible, the same reference numbers will be used throughout the drawings to refer to the same or like elements.

Figure 1:
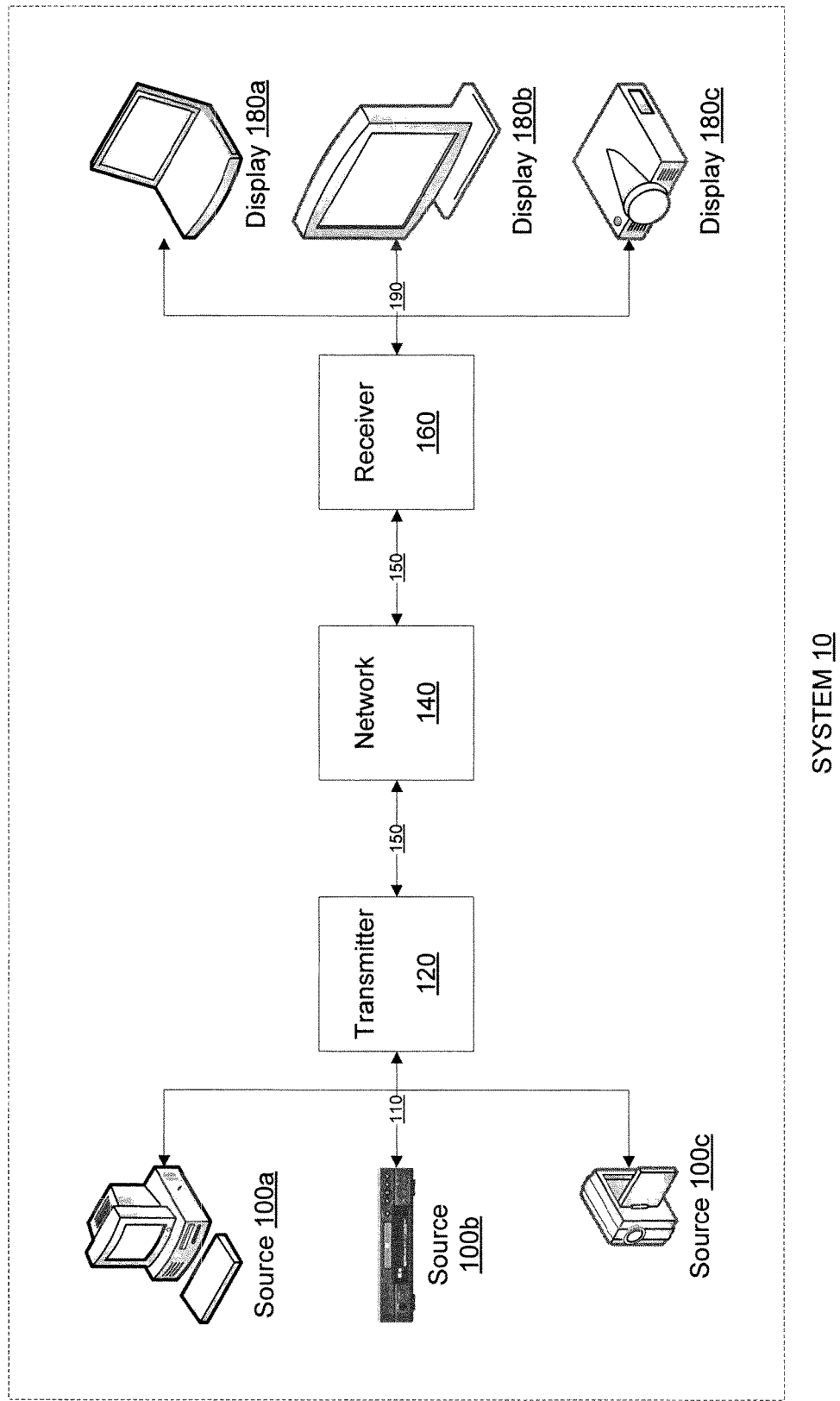
FIG. 1 illustrates a system for transmitting a multimedia stream according to an embodiment of the invention.

FIG. 1 illustrates a system for transmitting a multimedia stream according to an embodiment of the invention. System 10 comprises a source 100 (shown here as source 100a, source 100b, and source 100c) coupled to a transmitter 120 via link 110. The term "source 100" may refer to any of source 100a, source 100b, or source 100c, either singularly or collectively. Transmitter 120 is coupled to receiver 160 via link 150 on network 140. Receiver 160 is coupled to display 180 (shown here as display 180a, display 180b, and display 180c) via link 190. The term "display 180" may refer to any of display 180a, display 180b, or display 180c, either singularly or collectively.

Source 100 may be any of a variety of sources of multimedia streams including audio data and video data. Examples of source 100 may include a personal computer (PC), notebook computer, network attached storage (NAS) device, portable media device (PMD), smartphone, digital versatile disc (DVD) player, Blu-Ray player, video camera, digital video recorder (DVR), gaming console, cable or satellite set-top box (STB), and the like. Source 100 is coupled to transmitter 120 via link 110, which may be any of a variety of communication links using various interfaces and protocols for transmitting audio data and video data. For example, link 110 may utilize a high definition media interface (HDMI) or other interface such as DisplayPort, digital video interface (DVI), video graphics array (VGA), super-VGA, and the like. Source 100 has particular output characteristics or capabilities and outputs a multimedia stream (not shown) comprising audio data and video data having particular output characteristics. The audio data and video data may be encoded using MPEG, for example, or any of a variety of other audio encoding and video encoding protocols. The video data may also be encoded at a particular resolution such as 480p, 720p, 1080i, and 1080p as well as in a particular format or aspect ratio such as 4:3 or 16:9. The audio data may be encoded into a number of different channels, such as stereo, 2.1, 5.1, and 7.1.

Transmitter 120 is coupled to receiver 160 via link 150 on network 140. Network 140 may be any of a variety of networks utilizing various interfaces and protocols. For example, network 140 may be a power-line network, a coaxial cable network such as a multimedia over coax alliance (MoCA) network, an ISDN network, an Ethernet network, a Bluetooth network, an IEEE 802.11 wireless network, an ultra-wideband (UWB) network, and the like. Link 150 is an appropriate communication link for the particular network 140. For example, link 150 may be a wireless channel on a WiFi network 140.

Receiver 160 is coupled to display 180 via link 190. Display 180 may be any of a variety of displays capable of receiving and displaying audio data and video data. Examples of display 180 may include a television, a cathode ray tube (CRT) monitor, a liquid crystal display (LCD) monitor, a light-emitting diode (LED) monitor, a plasma monitor, a projector, a notebook computer, a portable media device, a smartphone, and the like. Display 180 may also comprise two separate devices, such as an LCD monitor for displaying video data and a speaker system for displaying audio data. Link 190 may be any of a variety of communication links using various interfaces and protocols for transmitting audio data and video data. For example, link 190 may utilize a high definition media interface (HDMI) or other interface such as DisplayPort, digital video interface (DVI), video graphics array (VGA), super-VGA, and the like. Display 180 may have associated display capabilities for displaying audio data and video data. For example, display 180 may be capable of displaying video data at particular resolutions, such as 480p, 720p, 1080i, and 1080p as well as in a particular format or aspect ratio such as 4:3 or 16:9. Display 180 may also be capable of displaying audio data encoded into a number of different channels, such as stereo, 2.1, 5.1, and 7.1. The display capabilities of display 180 may differ from the output characteristics of source 100.

Figure 2A:
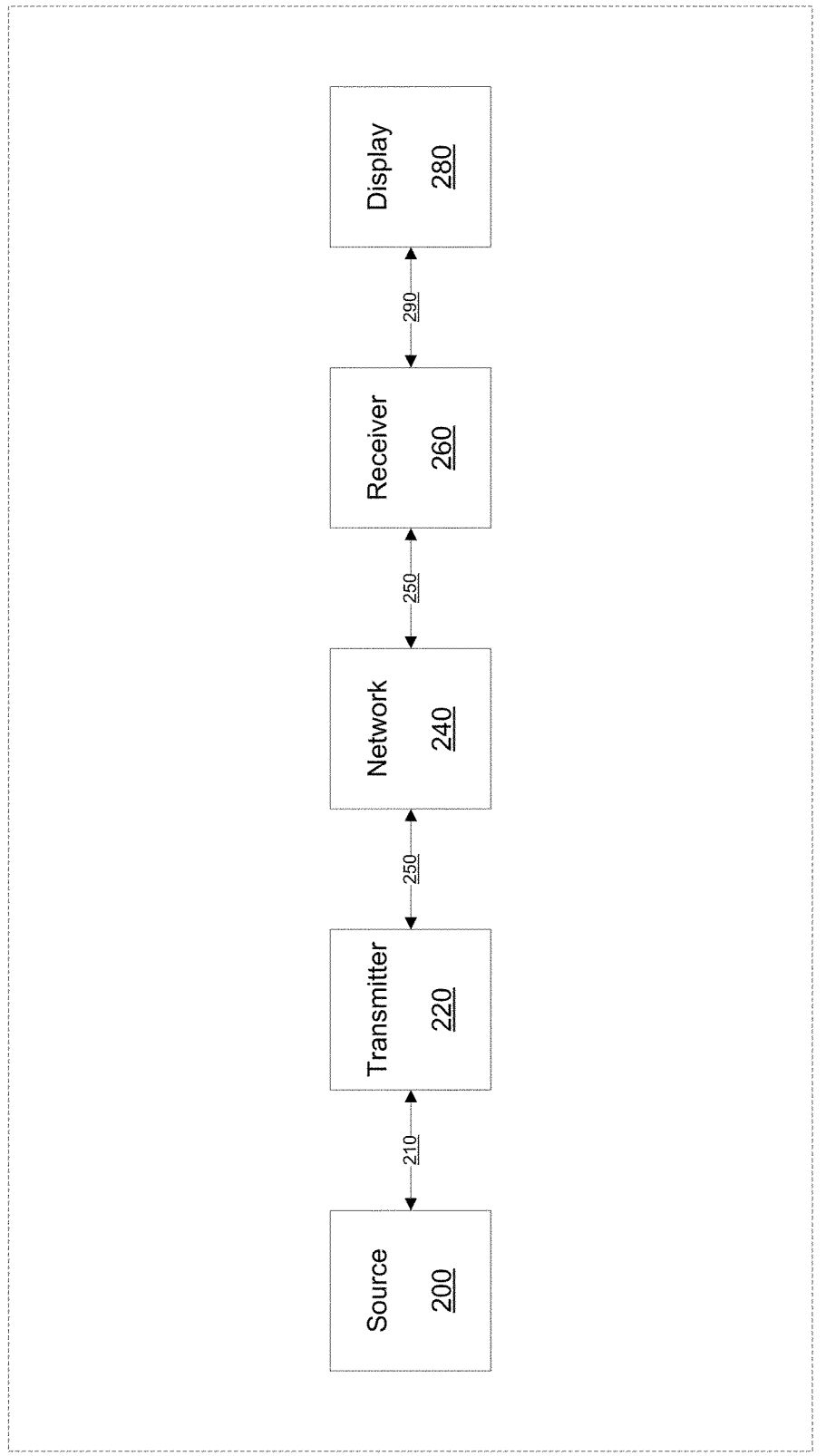
FIG. 2A illustrates a system for transmitting a multimedia stream according to an embodiment of the invention.

FIG. 2A illustrates a system for transmitting a multimedia stream according to an embodiment of the invention. System 20 comprises a source 200 coupled to a transmitter 220 via link 210. Transmitter 220 is coupled to receiver 260 via link 250 on network 240. Receiver 260 is coupled to display 280 via link 290. Source 200, link 210, transmitter 220, network 240, link 250, display 280, and link 290 correspond to source 100, link 110, transmitter 120, network 140, link 150, display 180, and link 190, respectively of FIG. 1.

Figure 2B:
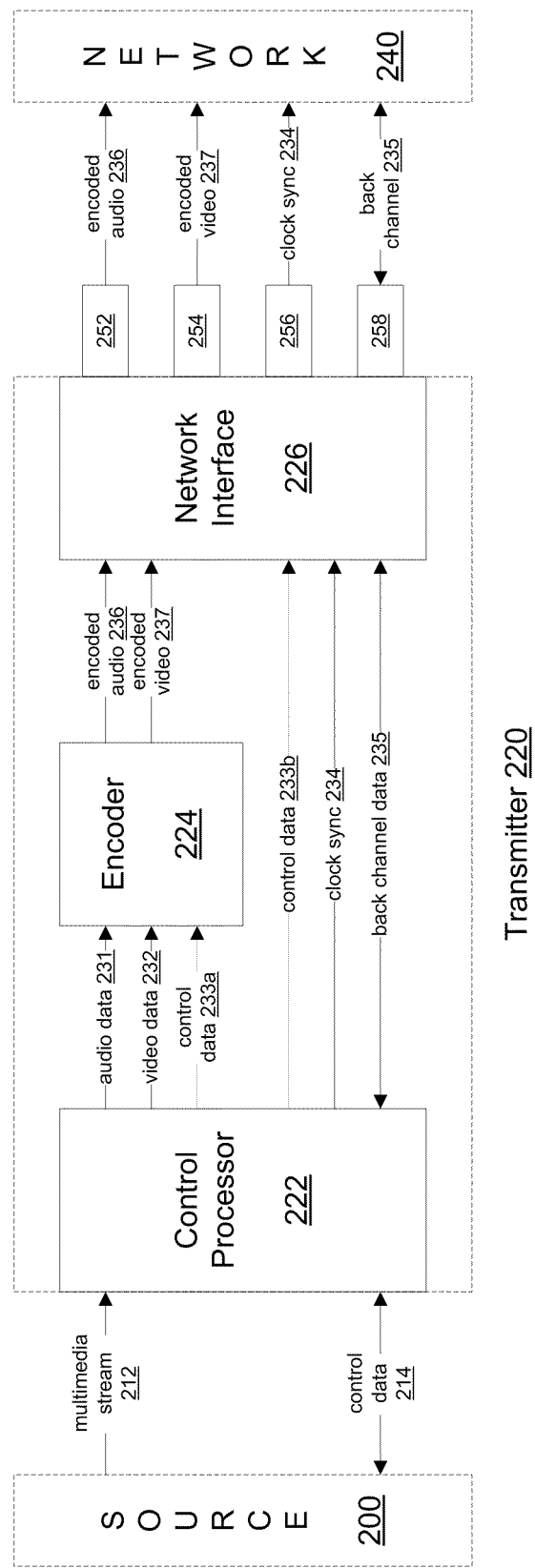
FIG. 2B illustrates a transmitter for transmitting a multimedia stream according to an embodiment of the invention.

FIG. 2B illustrates a transmitter for transmitting a multimedia stream according to an embodiment of the invention. Transmitter 220 is coupled to source 200 and is also coupled to network 240 via link 250 (not shown). Link 250 comprises network queues 252, 254, 256, and 258. Transmitter 220 is interposed between source 200 and network 240. Transmitter 220 comprises control processor 222 coupled to encoder 224, which in turn is coupled to network interface 226. Control processor 222 is also coupled to network interface 226. Network interface 226 is coupled to network 240 via network queues 252, 254, 256, and 258 of link 250 (not shown). Transmitter 220 may comprise a combination of hardware and software modules. For example, control processor 222 may be a general microprocessor, a specialized processor, a programmable module, or application specific integrated circuit (ASIC). Encoder 224 may be implemented as a software module executing on control processor 222 or may be implemented as a dedicated hardware module. Network interface 226 may likewise be implemented as a software module executing on control processor 222 or may be implemented as a dedicated hardware module.

Figure 2C:
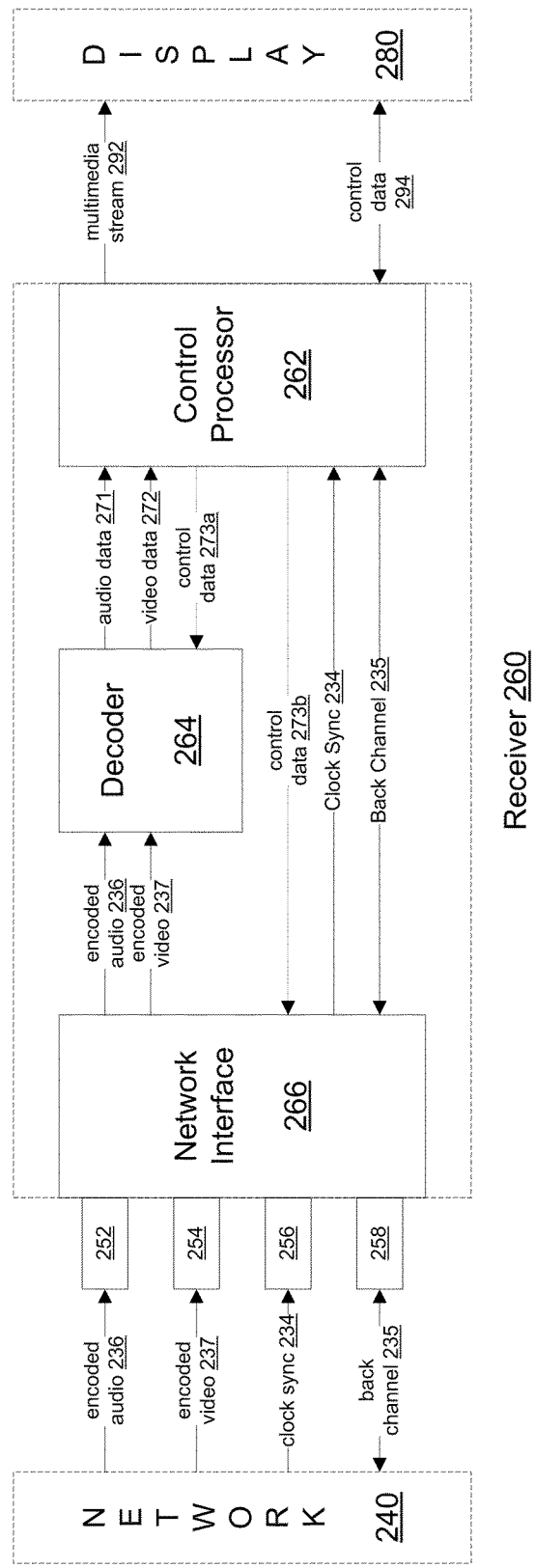
FIG. 2C illustrates a receiver for receiving a multimedia stream according to an embodiment of the invention.

FIG. 2C illustrates a receiver for receiving a multimedia stream according to an embodiment of the invention. Receiver 260 is coupled to network 240 via link 250 (not shown) and is also coupled to display 280. As in FIG. 2B, link 250 comprises network queues 252, 254, 256, and 258. Receiver 260 is interposed between network 240 and display. Receiver 260 comprises control processor 262 coupled to decoder 264, which in turn is coupled to network interface 266. Control processor 262 is also coupled to network interface 266. Network interface 266 is coupled to network 240 via network queues 252, 254, 256, and 258 of link 250 (not shown). Receiver 260 may comprise a combination of hardware and software modules. For example, control processor 262 may be a general microprocessor, a specialized processor, a programmable module, or application specific integrated circuit (ASIC). Decoder 264 may be implemented as a software module executing on control processor 262 or may be implemented as a dedicated hardware module. Network interface 266 may likewise be implemented as a software module executing on control processor 262 or may be implemented as a dedicated hardware module.

The operation of a system for transmitting a multimedia stream as shown FIGS. 2A-2C is described in co-pending application No. 12/774,585, filed on May 5, 2010, entitled "SYSTEM AND METHOD FOR TRANSMITTING MULTIMEDIA STREAM," the entire disclosure of which is incorporated by reference.

Figure 3:
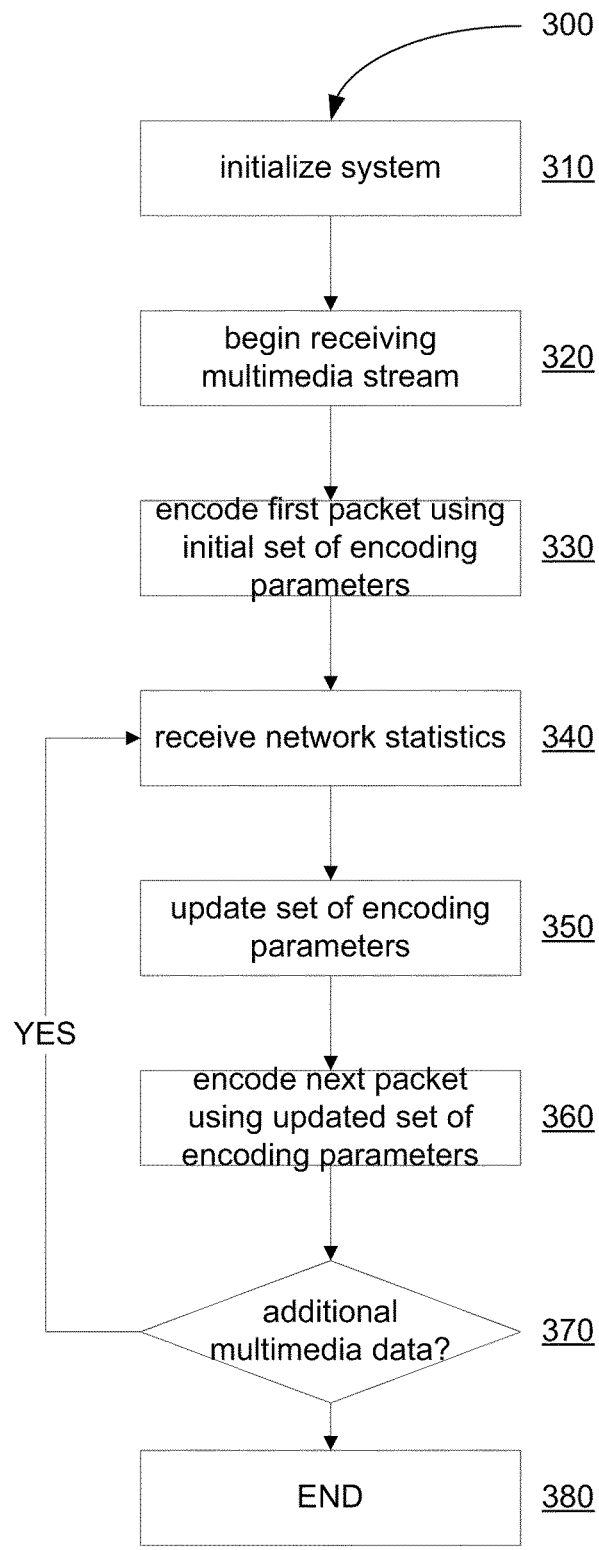
FIG. 3 illustrates a method for transmitting a multimedia stream according to an embodiment of the invention.

FIG. 3 illustrates a method for transmitting a multimedia stream according to an embodiment of the invention. The method 300 begins with initializing the system at step 310. Initializing the system may include, for example, exchanging information relating to the source output characteristics and the display capabilities. For example, source 200 may transmit its output characteristics to transmitter 220 as part of control data 214. Display 280 may transmit its display capabilities to receiver 260 as part of control data 294. Receiver 260 may transmit the display capabilities information to transmitter 220 as part of back channel data 235 utilizing network queue 258. This information relating to the source output characteristics and the display capabilities can be used by the transmitter 220 to determine an initial set of encoding parameters with respect to, for example, video resolution and aspect ratio. The transmitter 220 may also gather network statistics and metrics to determine an initial video encoding bit rate. For example, control processor 222 may measure the round trip time (RTT) of a test packet sent as part of back channel data 235 through network queue 258 to receiver 260. Alternatively, network interface 226 may receive network statistics or metrics from the network 240 and transmit this information to control processor 222. The process continues with receiving the multimedia stream at step 320. In one embodiment, control processor 222 may derive output characteristics of source 200 from the multimedia stream itself and use this information, along with display capabilities information to determine an initial set of encoding parameters. The next step involves encoding a first packet using the initial set of encoding parameters at step 330. As used herein, the term "packet" may refer to one frame or less than one frame of the multimedia stream. Also, the term "packet" may refer to both audio data and video data either separately or in combination. For example, encoder 224 may encode a first frame of audio data 231 and a first frame of video data 232 into a first packet of encoded audio 236 and a first packet of encoded video 237 and transmit these packets to network interface 226 for placement into an appropriate network queue according to control processor 222. The process continues with receiving network statistics at step 340. For example, control processor 222 may measure the round trip time (RTT) of the first packet of encoded audio 236 and/or the first packet of encoded video 237 sent through network queues 252 and 254 to receiver 260. Alternatively, network interface 226 may receive network statistics or metrics from the network 240 and transmit this information to control processor 222. In another example, receiver 260 may transmit back channel data 235 including network statistics or metrics, such as bit error rate (BER), to the transmitter 220. Based on the network statistics received in step 340, the process continues with updating the set of encoding parameters at step 350. For example, control processor 222 may utilize such back channel data 235 to adjust the encoding parameters used by encoder 224. If the bit error rate (BER) is too high, then control processor 222 may adjust the encoding parameters to utilize a lower bit rate or to increase redundancy. The process continues with encoding the next packet using the updated set of encoding parameters at step 360. At step 370, the process determines whether there is additional multimedia data. If yes, then the process loops back to step 340. Otherwise, the process terminates at step 380.

Embodiments of the present invention utilize novel techniques for achieving low-latency multimedia streaming. These techniques include sub-frame rate adaptation. Examples are provided as they are applied to MPEG encoded streams, but the techniques may be applied using other encoding schemes as well.

MPEG video compression is widely used today. The basic idea behind MPEG video compression is to remove spatial redundancy within a video frame using DCT-based (discrete cosine transform) compression (as in JPEG for still images), and to exploit temporal redundancy between video frames. Within small time intervals, the images in a video stream usually do not change much. MPEG video compression exploits this temporal redundancy and uses motion-compensation to allow encoding a particular video frame based on other video frames temporally close to it. Typically, frames are divided into 16×16 pixel macroblocks (MBs). Each macroblock consists of four 8×8 luminance blocks and two 8×8 chrominance blocks. Macroblocks are the units for motion-compensated compression. Blocks are used for DCT compression.

There are three types of frames in MPEG video encoding: intra-frames (I-frames), forward predicted frames (P-frames), and bi-directional predicted frames (B-frames). An I-frame is encoded as a single image without reference to any past or future frames. The encoding scheme for an I-frame is similar to JPEG compression. A P-frame is encoded relative to the closest preceding past reference frame. The reference frame for a P-frame may either be an I-frame or a P-frame. Each macroblock in a P-frame can be encoded either as an I-macroblock or as a P-macroblock. An I-macroblock is encoded just like a macroblock in an I-frame. A P-macroblock is encoded as a 16×16 area of the past reference frame, plus an error term. To specify the 16×16 area of the reference frame, a motion vector is included. Finally, a B-frame is encoded relative to the past reference frame, the future reference frame, or both frames. The future reference frame is the closest following reference frame, which may be either an I-frame or a P-frame. B-frames are encoded in a similar manner as for P-frames, except that motion vectors may refer to areas in the future reference frames.

Figure 4:
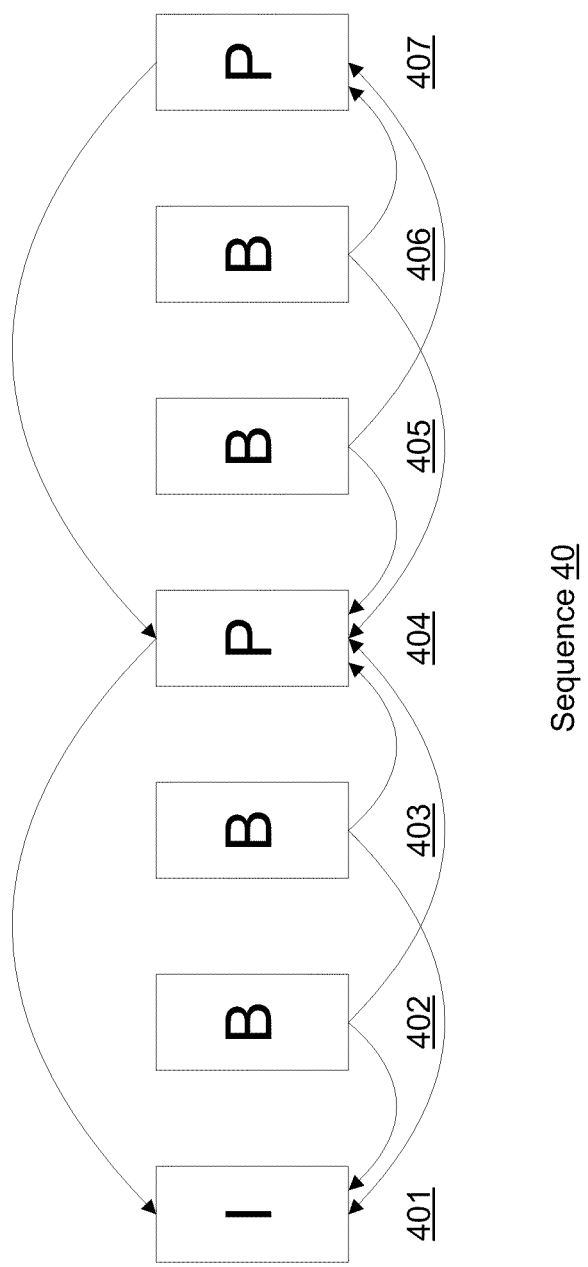
FIG. 4 shows an example of a typical IPB sequence 40 in an MPEG-encoded video stream.

FIG. 4 shows an example of a typical IPB sequence 40 in an MPEG-encoded video stream. The arrows represent inter-frame dependencies. As can be seen in FIG. 4, frame 401 is an I-frame. Frame 404, a P-frame, depends on frame 401. Frames 402 and 403 are B-frames that depend on frame 401 and also on frame 404. Similarly, frame 407 is a P-frame that depends on frame 404. Frames 405 and 406 are B-frames that depend on frame 404 and also on frame 407.

In MPEG video compression, a video sequence is composed of a series of Groups of Pictures (GOPs). Each GOP comprises a sequence of pictures, i.e., frames. Each frame comprises a series of slices. Each slice comprises a series of macroblocks. Finally, each macroblock comprises a number of blocks and possibly a motion vector. In a sense, each slice is an independently decodable unit. A slice may comprise as much as 1 frame or as little as 1 macroblock. The slice structure is intended to allow decoding in the presence of errors. However, an advantageous bonus is that it allows parallel processing at the slice level. It also allows for advantageous encoding rate adaptation at the slice level.

FIG. 5 shows an example of a video frame divided into slices. In FIG. 5, frame 50 comprises 9 slices 501, 502, 503, 504, 505, 506, 507, 508, and 509. Slice 501 comprises macroblocks numbered 1-16. Slice 502 comprises macroblocks numbered 17-32. Slice 503 comprises macroblocks number 33-48. Slice 504 comprises macroblocks numbered 49-64. Slice 505 comprises macroblocks number 65-80. Slice 506 comprises macroblocks numbered 81-96. Slice 507 comprises macroblocks numbered 97-112. Slice 508 comprises macroblocks numbered 113-128. Slice 509 comprises macroblocks numbered 129-144.

Each of the slices 501-509 of FIG. 5 is an independently decodable unit. Also, each of the slices 501-509 may be encoded using different encoding parameters in response to changing conditions of the communication link between transmitter and receiver.

Figure 6A:
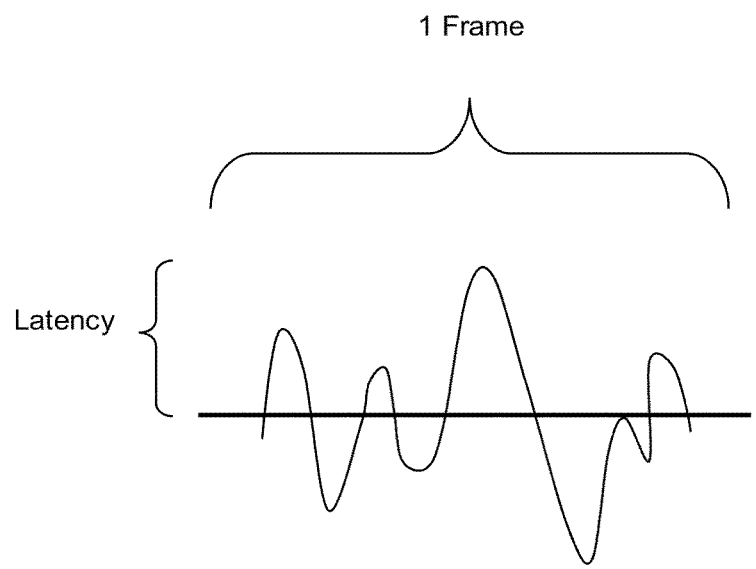
FIG. 6A illustrates the use of rate control and buffering techniques and the effects on latency.
Figure 6B:
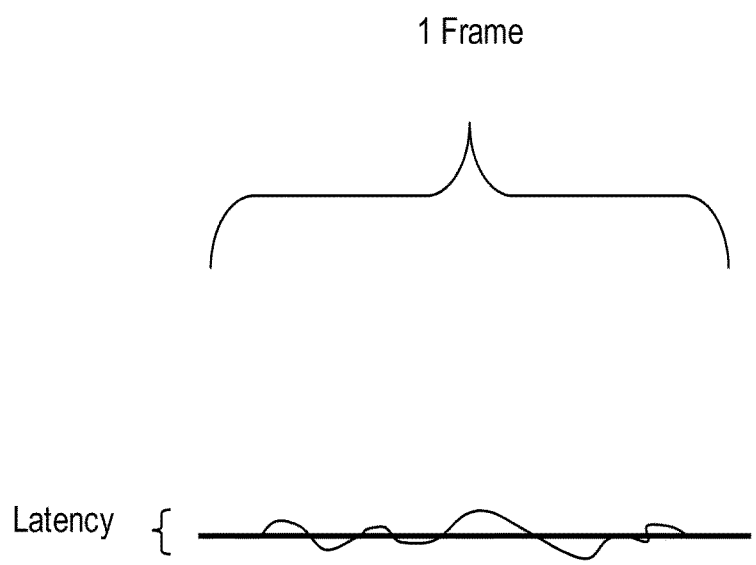
FIG. 6B illustrates the use of rate control and buffering techniques and the effects on latency.

FIG. 6A and FIG. 6B illustrate the use of rate control and buffering techniques and the effects on latency. In FIG. 6A, loose rate control is employed and, as a result, the encoded video bit rate may fluctuate widely during the period of one frame of video. As can be seen, the encoded video bit rate may exceed the average channel bit rate. Employing loose rate control in this manner produces potentially high latency and requires a large amount of buffering. In FIG. 6B, tight intra-frame rate control is employed, which reduces the amount of fluctuation in the encoded video bitrate. In FIG. 6B, latency and buffering requirements can be reduced. Embodiments of the present invention utilize slice processing along with sub-frame rate adaptation to achieve low-latency streaming of multimedia data.

Figure 7A:
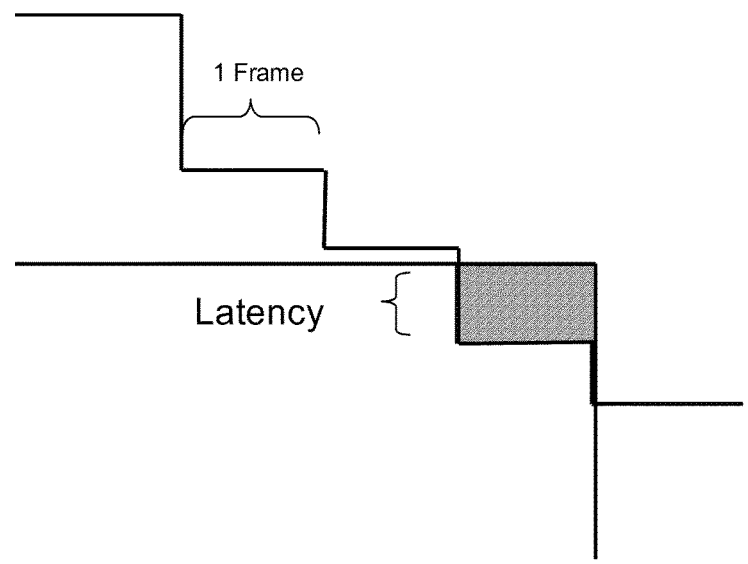
FIG. 7A illustrates the use of adaptive rate control and the effects on latency.
Figure 7B:
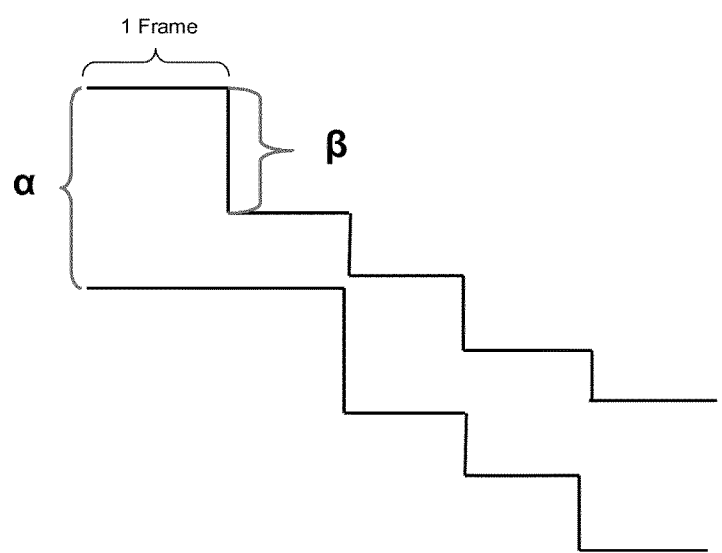
FIG. 7B illustrates the use of adaptive rate control and the effects on latency according to an embodiment of the present invention.

FIG. 7A and FIG. 7B illustrate the use of adaptive rate control and the effects on latency. In FIG. 7A, the rate control scheme is purely reactive. The encoded video data rate is only reduced after the measured channel bit rate has been exceeded. This technique leads to a latency of at least one frame. The encoded video data rate is then drastically reduced which results in a sudden drops in encoded video data rate and a corresponding sudden drop in video quality. In FIG. 7B, a headroom $\alpha$ is maintained at all times between the measured channel bit rate and the encoded video data rate. As long as the headroom $\alpha$ exceeds a reduction in channel bit rate $\beta$, no latency is introduced. Embodiments of the present invention utilize this technique of maintaining at all times a headroom $\alpha$ between the measured channel bit rate and the encoded video data rate.

Figure 8A:
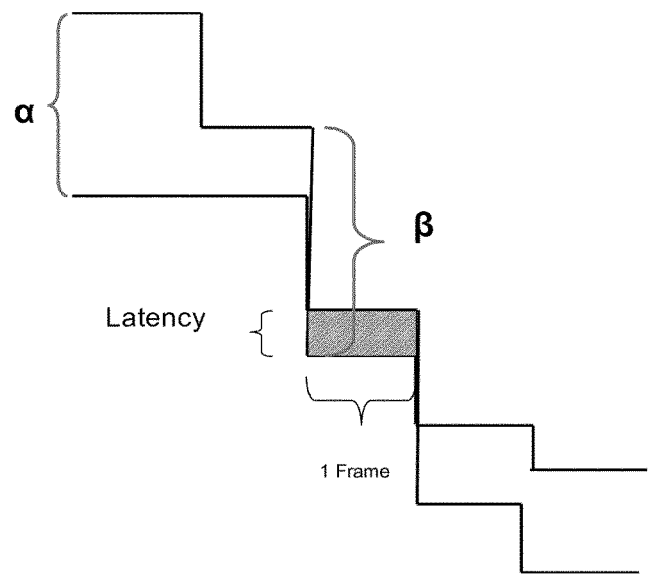
FIG. 8A illustrates the use of single-frame rate adaptation and the effects on latency.
Figure 8B:
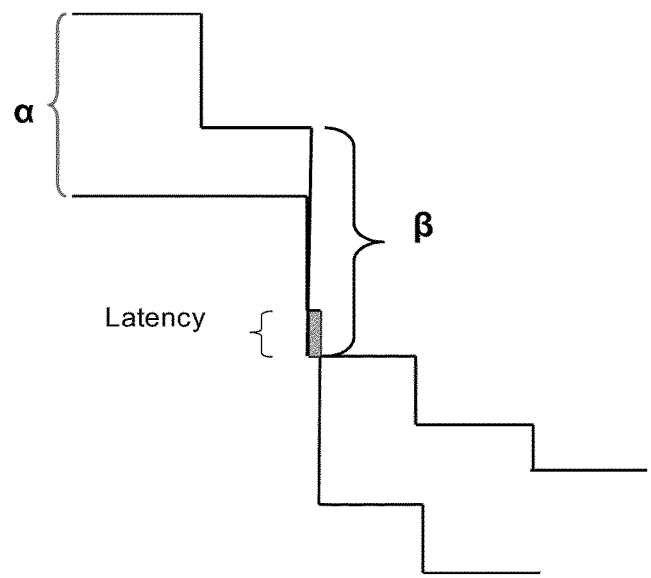
FIG. 8B illustrates the use of sub-frame rate adaptation and the effects on latency according to an embodiment of the present invention.

FIG. 8A and FIG. 8B illustrate the use of sub-frame rate adaptation and the effects on latency. In FIG. 8A, the rate control scheme adjusts the encoded video data rate at the frame level. This technique leads to a latency of at least one frame. When the drop in channel bit rate $\beta$ exceeds the headroom $\alpha$, latency is introduced for a period of at least one frame, until the encoded video data rate can be adjusted. In FIG. 8B, latency is introduced only for a portion of the frame following the reduction in the channel bit rate. The encoded video bit rate is adjusted at the sub-frame level, allowing for a much more rapid adaptation to the changing channel conditions. Embodiments of the present invention utilize this technique of sub-frame rate adaptation to minimize latency.

Figure 9:
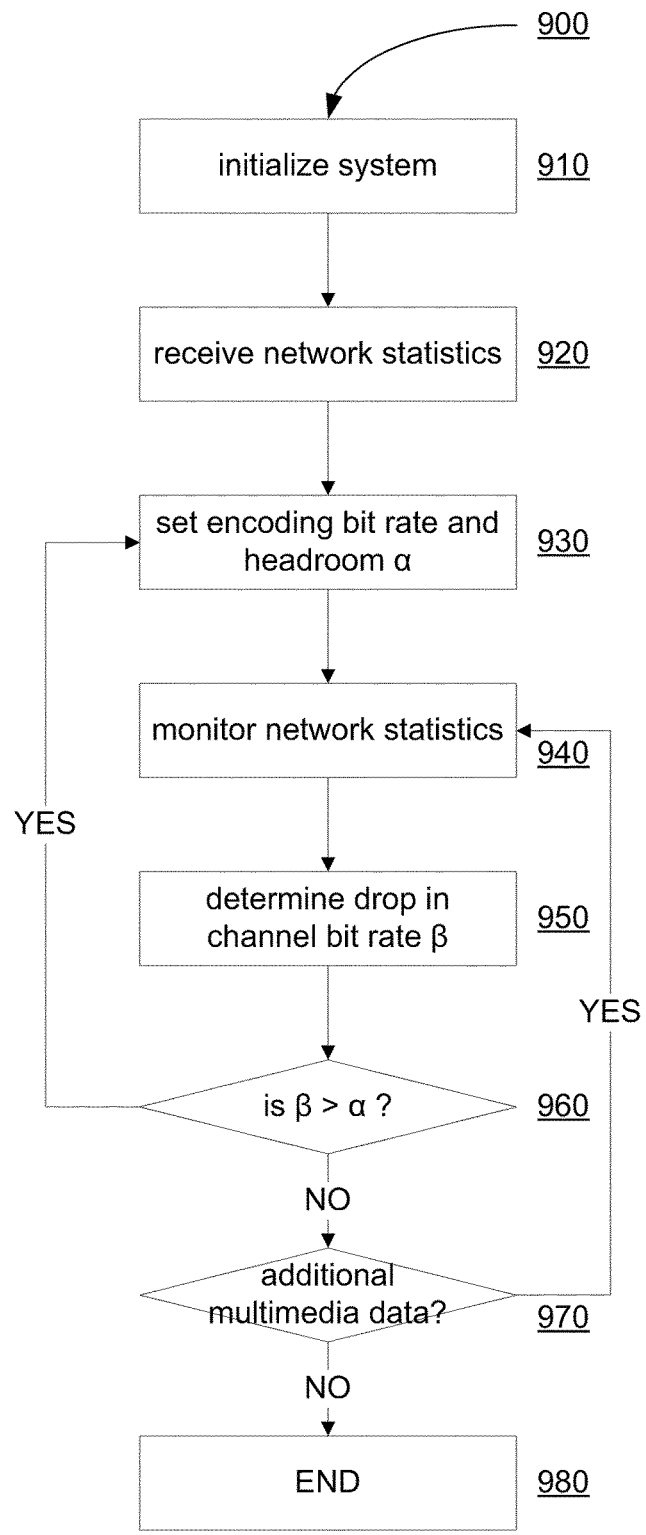
FIG. 9 illustrates a method for providing adaptive rate control for encoding a multimedia stream according to an embodiment of the invention.

FIG. 9 illustrates a method for providing adaptive rate control for encoding a multimedia stream according to an embodiment of the invention. The method 900 begins with initializing the system at step 910. Initializing the system may include, for example, exchanging information relating to the source output characteristics and the display capabilities. For example, source 200 may transmit its output characteristics to transmitter 220 as part of control data 214. Display 280 may transmit its display capabilities to receiver 260 as part of control data 294. Receiver 260 may transmit the display capabilities information to transmitter 220 as part of back channel data 235 utilizing network queue 258. This information relating to the source output characteristics and the display capabilities can be used by the transmitter 220 to determine an initial set of encoding parameters with respect to, for example, video resolution and aspect ratio. The method continues with receiving network statistics at step 920. The transmitter 220 may gather network statistics and metrics to determine an initial video encoding bit rate. For example, control processor 222 may measure the round trip time (RTT) of a test packet sent as part of back channel data 235 through network queue 258 to receiver 260. Alternatively, network interface 226 may receive network statistics or metrics from the network 240 and transmit this information to control processor 222. The method continues with setting the encoding bit rate and headroom $\alpha$ at step 930. The method continues with monitoring network statistics at step 940. For example, control processor 222 may measure the round trip time (RTT) of the first packet of encoded audio 236 and/or the first packet of encoded video 237 sent through network queues 252 and 254 to receiver 260. Alternatively, network interface 226 may receive network statistics or metrics from the network 240 and transmit this information to control processor 222. In another example, receiver 260 may transmit back channel data 235 including network statistics or metrics, such as bit error rate (BER), to the transmitter 220. Based on the network statistics received in step 940, the method continues with determining a drop in channel bit rate $\beta$ at step 950. At step 960, the drop in channel bit rate $\beta$ is compared to the headroom $\alpha$. If $\beta$ is greater than $\alpha$, the method loops back to step 930. The encoding bit rate may be adjusted and the headroom $\alpha$ may also be adjusted. If $\beta$ is not greater than $\alpha$, then no rate adjustment is needed and the method proceeds to step 970. The method determines whether there is additional multimedia data. If yes, then the method loops back to step 940. Otherwise, the method terminates at step 980.

The adaptive-rate encoder 224 of FIG. 2B may use the method 900 of FIG. 9 to adjust either the video encoding bit rate or the headroom according to changing channel conditions. However, the method 900 deals only with decreasing the video encoding bit rate (or increasing the headroom $\alpha$) when the channel bit rate is exceeded. When channel conditions improve, the adaptive-rate encoder 224 may increase the video encoding bit rate according to the headroom $\alpha$, so that the encoder 224 tracks not only decreases in the channel bit rate but increases as well.

Moreover, the adaptive-rate encoder 224 may also increase the video encoding bit rate when channel conditions remain relatively constant or do not degrade significantly over time. For example, the encoder 224 may determine a current channel bit rate (cur_CBR) of the communication link, determine a current headroom factor cur_$\alpha$, and set a current video bit rate (cur_VBR) for encoding the multimedia stream such that the cur_CBR−cur_VBR≥cur_$\alpha$. As the encoder 224 continues to monitor the channel conditions, it may determine, for example, a local maximum drop in channel bit rate loc_max_$\beta$, wherein loc_max_$\beta$ is the largest $\beta$ observed over a time period t. Accordingly, the encoder 224 may adjust one or more of cur_VBR and cur_$\alpha$ if loc_max_$\beta$≤a predetermined threshold $\beta$_min or if t≥a predetermined threshold t_max. In this way, when the channel bit rate is not dropping much over a period of time, the video encoding bit rate may be safely increased or the headroom α may be decreased.

As another example, the encoder 224 may determine an average drop in channel bit rate avg_β, wherein avg_β is the average β observed over a time period t. Accordingly, the encoder 224 may adjust one or more of cur_VBR and cur_α if avg_β≤a predetermined threshold β_min or if t≥a predetermined threshold t_max. Again, when the channel bit rate is not dropping much over a period of time, the video encoding bit rate may be safely increased or the headroom α may be decreased.

The encoder 224 of FIG. 2B may utilize additional techniques in order to provide low-latency streaming. For example, the encoder 224 may prohibit the use of B-frames. B-frames introduce inherent latency into the system because the decoder must wait for temporally subsequent frames in order to decode a B frame. Additionally, encoding I-frame macroblocks within P-frames may reduce bandwidth requirements. This creates intra-constrained predictive frames and dramatically reduces the encoded video bit rate since higher compression ratios may be achieved using more P-frames in place of I-frames. Alternatively, the transmitter 220 of FIG. 2B may adjust the modulation scheme used to transmit the encoded video stream according to changing network conditions.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. A method of transmitting a multimedia stream over a network, comprising:
receiving a multimedia stream from a source, the multimedia stream comprising video data;
determining a first set of video encoding parameters;
encoding a first portion of the video data into a first encoded video slice using the first set of video encoding parameters;
transmitting the first encoded video slice over a communication link of the network to a receiver;
monitoring conditions of the communication link;
determining a second set of video encoding parameters based on the conditions of the communication link;
encoding a second portion of the video data into a second encoded video slice using the second set of video encoding parameters;
transmitting the second encoded video slice over the communication link to the receiver,
wherein the first encoded video slice and the second encoded video slice each comprise a series of macroblocks constituting a segment of a frame, wherein each segment of the frame is an independently decodable unit that is processed in parallel with other segments of the frame to establish sub-frame level processing; and
adjusting an encoded video bit rate at the sub-frame level to allow for rapid adaptation to changing channel conditions and to minimize latency.

2. The method of claim 1, wherein determining a first set of video encoding parameters comprises:
determining a current channel bit rate (cur_CBR) of the communication link;
determining a current headroom factor cur_α, wherein cur_α is the difference between the current channel bit rate and an encoded video data rate; and
setting a current video bit rate (cur_VBR) for encoding the multimedia stream such that the cur_CBR−cur_VBR≥cur_α.

3. The method of claim 2, wherein determining a second set of video encoding parameters based on the conditions of the communication link comprises:
monitoring the communication link to determine a new channel bit rate (new_CBR);
determining a channel bit rate reduction β, wherein β=cur_CBR−new_CBR; and
adjusting cur_VBR if β cur_α.

4. The method of claim 2, wherein determining a second set of video encoding parameters based on the conditions of the communication link comprises:
monitoring the communication link to determine a new channel bit rate (new_CBR);
determining a channel bit rate reduction β, wherein β=cur_CBR−new_CBR; and
adjusting cur_α if β≥cur_α.

5. The method of claim 2, wherein determining a second set of video encoding parameters based on the conditions of the communication link comprises:
monitoring the communication link to determine a new channel bit rate (new_CBR);
determining a channel bit rate reduction β, wherein β=cur_CBR−new_CBR;
determining a local maximum drop in channel bit rate loc_max_β, wherein loc_max β is the largest β observed over a time period t; and
adjusting one or more of cur_VBR and cur_α if loc_max β≤a predetermined threshold β_min or if t≥a predetermined threshold t_max.

6. The method of claim 2, wherein determining a second set of video encoding parameters based on the conditions of the communication link comprises:
monitoring the communication link to determine a new channel bit rate (new_CBR);
determining a channel bit rate reduction β wherein β=cur_CBR−new_CBR;
determining an average drop in channel bit rate avg_β, wherein avg_β is the average β observed over a time period t; and
adjusting one or more of cur_VBR and cur_α if avg_β≤a predetermined threshold β_min or if t≥a predetermined threshold t_max.

7. A method of encoding a multimedia stream for transmission over a network comprising:
determining a current channel bit rate (cur_CBR) of a communication link on the network;
determining a current headroom factor cur_α, wherein cur_α is the difference between the current channel bit rate and an encoded video data rate;
setting a current video bit rate (cur_VBR) for encoding the multimedia stream such that the cur_CBR−cur_VBR≥cur_α;
monitoring the communication link to determine a new channel bit rate (new_CBR);
determining a channel bit rate reduction β, wherein β=cur_CBR−new_CBR; and
adjusting cur_VBR if β>cur_α;
wherein the multimedia stream includes a series of macroblocks constituting a segment of a frame, wherein each segment of the frame is an independently decodable unit that is processed in parallel with other segments of the frame to establish sub-frame level processing; and
adjusting an encoded video bit rate at the sub-frame level to allow for rapid adaptation to changing channel conditions and to minimize latency.

8. The method of claim 7, further comprising:
adjusting cur_α if β>cur_α.

9. The method of claim 7, further comprising:
determining a local maximum drop in channel bit rate loc_max_β wherein loc_max_β is the largest β observed over a time period t; and
adjusting one or more of cur_VBR and cur_α if loc_max_β≤a predetermined threshold β_min or if t≥a predetermined threshold t_max.

10. The method of claim 7, further comprising:
determining an average drop in channel bit rate avg_β, wherein avg_β is the average β observed over a time period t; and
adjusting one or more of cur_VBR and cur_α if avg_β≤a predetermined threshold β_min or if t≥a predetermined threshold t_max.

11. A system for transmitting a multimedia stream over a network comprising:
a transmitter adapted to perform the following:
receive a multimedia stream from a source, the multimedia stream comprising video data;
determine a first set of video encoding parameters;
encode a first portion of the video data into a first encoded video slice using the first set of video encoding parameters;
transmit the first encoded video slice over a communication link of the network to a receiver;
monitor conditions of the communication link;
determine a second set of video encoding parameters based on the conditions of the communication link;
encode a second portion of the video data into a second encoded video slice using the second set of video encoding parameters; and
transmit the second encoded video slice over the communication link to the receiver,
wherein the first encoded video slice and the second encoded video slice each comprise a series of macroblocks constituting a segment of a frame, wherein each segment of the frame is an independently decodable unit that is processed in parallel with other segments of the frame to establish sub-frame level processing; and
wherein the transmitter adjusts an encoded video bit rate at the sub-frame level to allow for rapid adaptation to changing channel conditions and to minimize latency.

12. The system of claim 11, wherein the transmitter is further adapted to perform the following:
determine a current channel bit rate (cur_CBR) of the communication link;
determine a current headroom factor cur_α; and
set a current video bit rate (cur_VBR) for encoding the multimedia stream such that the cur_CBR−cur_VBR≥cur_α.

13. The system of claim 12, wherein the transmitter is further adapted to perform the following:
monitor the communication link to determine a new channel bit rate (new_CBR);
determine a channel bit rate reduction β, wherein β=cur_CBR−new_CBR; and
adjust cur_VBR if β>cur_α.

14. The system of claim 12, wherein the transmitter is further adapted to perform the following:
monitor the communication link to determine a new channel bit rate (new_CBR);
determine a channel bit rate reduction β, wherein β=cur_CBR−new_CBR; and
adjust cur_α if β>cur_α.

15. The system of claim 12, wherein the transmitter is further adapted to perform the following:
monitor the communication link to determine a new channel bit rate (new_CBR);
determine a channel bit rate reduction β, wherein β=cur_CBR−new_CBR;
determine a local maximum drop in channel bit rate loc_max_β, wherein loc_max_β is the largest β observed over a time period t; and
adjust one or more of cur_VBR and cur_α if loc_max_β≤a predetermined threshold min or if t≥a predetermined threshold t_max.

16. The system of claim 12, wherein the transmitter is further adapted to perform the following:
monitor the communication link to determine a new channel bit rate (new_CBR);
determine a channel bit rate reduction β, wherein β=cur_CBR−new_CBR;
determine an average drop in channel bit rate avg_β, wherein avg_β is the average β observed over a time period t; and
adjust one or more of cur_VBR and cur_α if avg_β≤a predetermined threshold β_min or if t≥a predetermined threshold t_max.

17. A system for encoding a multimedia stream for transmission over a network comprising:
an encoder adapted to perform the following:
determine a current channel bit rate (cur_CBR) of a communication link on the network;
determine a current headroom factor cur_α;
set a current video bit rate (cur_VBR) for encoding the multimedia stream such that the cur_CBR−cur_VBR≥cur_α;
monitor the communication link to determine a new channel bit rate (new_CBR);
determine a channel bit rate reduction β, wherein β=cur_CBR−new_CBR; and
adjust cur_VBR if β>cur_α;
wherein the multimedia stream includes a series of macroblocks constituting a segment of a frame, wherein each segment of the frame is an independently decodable unit that is processed in parallel with other segments of the frame to establish sub-frame level processing; and
wherein the encoder adjusts an encoded video bit rate at the sub-frame level to allow for rapid adaptation to changing channel conditions and to minimize latency.

18. The system of claim 17, wherein the encoder is further adapted to perform the following:
adjust cur_α if β>cur_α.

19. The system of claim 17, wherein the encoder is further adapted to perform the following:
determine a local maximum drop in channel bit rate loc_max_β, wherein loc_max_β is the largest β observed over a time period t; and
adjust one or more of cur_VBR and cur_α if loc_m β≤a predetermined threshold β_min or if t≥a predetermined threshold t_max.

20. The system of claim 17, wherein the encoder is further adapted to perform the following:
   determine an average drop in channel bit rate $avg\_\beta$, wherein $avg\_\beta$ is the average $\beta$ observed over a time period t; and
   adjust one or more of $cur\_VBR$ and $cur\_\alpha$ if $avg\_\beta \leq a$ predetermined threshold $\beta\_min$ or if $t \geq a$ predetermined threshold $t\_max$.

* * * * *